United States Patent [19]

McCullough

[11] Patent Number: 4,922,613

[45] Date of Patent: May 8, 1990

[54] PNEUMATIC CONTROL SYSTEM FOR MEAT TRIMMING KNIFE

[75] Inventor: Timothy J. McCullough, Vermilion, Ohio

[73] Assignee: Food Industry Equipment International, Inc., Lorain, Ohio

[21] Appl. No.: 354,618

[22] Filed: May 19, 1989

Related U.S. Application Data

[63] Continuation-in-part of Ser. No. 102,322, Sep. 29, 1987.

[51] Int. Cl.⁵ ........................ B26B 7/00; B26B 15/00; F16D 27/00; F16D 31/02

[52] U.S. Cl. ........................................... 30/276; 30/1; 192/3.33; 192/84 R

[58] Field of Search ............................ 30/1, 276, 228; 192/3.33, 3.5, 3.56, 84 R

[56] References Cited

U.S. PATENT DOCUMENTS

| | | | |
|---|---|---|---|
| 3,024,532 | 3/1962 | Bettcher | 30/276 |
| 3,269,010 | 8/1966 | Bettcher | 30/276 |
| 3,472,323 | 10/1969 | Hall | 173/163 |
| 3,553,967 | 1/1971 | Porter et al. | 60/54.5 |
| 3,605,841 | 9/1971 | Lindstrom et al. | 146/203 |
| 3,710,445 | 1/1973 | Roth | 30/241 |
| 3,747,728 | 7/1973 | Hollander | 192/84 R |
| 3,852,882 | 12/1974 | Bettcher | 30/276 |
| 4,164,813 | 8/1979 | Dittert et al. | 30/272 |
| 4,228,880 | 10/1980 | Gee | 192/84 R |
| 4,363,170 | 12/1982 | McCullough | 30/276 |
| 4,474,178 | 10/1984 | Hyatt | 128/303.1 |
| 4,494,311 | 1/1985 | McCullough | 30/276 |
| 4,575,938 | 3/1986 | McCullough | 30/276 |
| 4,644,648 | 2/1987 | Pellenc | 30/228 |
| 4,702,006 | 10/1987 | McCullough | 30/276 |
| 4,749,073 | 6/1988 | Olson | 192/84 R |

FOREIGN PATENT DOCUMENTS

| | | | |
|---|---|---|---|
| 1468521 | 3/1977 | United Kingdom | 200/837 |

*Primary Examiner*—Douglas D. Watts
*Assistant Examiner*—Paul M. Heyrana, Sr.
*Attorney, Agent, or Firm*—Michael Sand Co.

[57] ABSTRACT

A pneumatic control system for a meat trimming knife in which an annular cutting blade of the knife is rotated by a flexible cable driven by an electric motor munted remote from the knife. An annular diaphragm is mounted in the handle of the knife and is compressed by the manual inward movement of a piston by an operator. The diaphragm is connected by an air conduit which extends along the flexible drive cable to a pressure switch mounted adjacent the electric drive motor. The switch senses compression of the diaphragm and generates an electric control signal which actuates an electric clutch which couples the output shaft of the electric motor to the flexible cable for rotating the cutting blade. The piston is maintained in a diaphragm compressed position by a hand-operated lever mounted on the handle. Upon release of the lever by the operator a coil spring returns the piston to its retracted position permitting the diaphragm to expand whereupon the pressure switch senses the change in fluid or pressure within the diaphragm which signals the clutch to disengage the motor shaft from the flexible cable to stop the rotation of the cutting blade. In a modified embodiment a diaphragm pump supplies a flow of low pressure, low volume air to the handpiece. A pivotally mounted lever on the handpiece changes this air flow which is sensed by a pressure sensor which actuates the electrical clutch through a logic circuit to control the flexible drive cable. A torque selector enables the amount of torque supplied to the handpiece to be varied to complement the size of the handpiece.

20 Claims, 6 Drawing Sheets

PNEUMATIC CONTROL SYSTEM FOR MEAT TRIMMING KNIFE

CROSS REFERENCE TO RELATED APPLICATION

This application is a continuation-in-part of pending application Ser. No. 07/102,322, filed Sept. 29, 1987.

TECHNICAL FIELD

The invention relates to meat cutting devices and particularly to a power meat cutting tool adapted to be manually held and manipulated for the quick and easy removal of meat from carcasses and bones. More particularly the invention relates to a pneumatic control system for stopping and starting the rotatably mounted cutting blade attached to the front of the handpiece of the cutting tool which increases safety and reduces fatigue for the operator.

BACKGROUND INFORMATION

Various styles of power driven meat cutting tools have been devised wherein a ring blade is rotatably mounted on a blade holder which in turn is mounted on a manually operated, power driven handle or handpiece. These tools have been used for some time in the meat industry to facilitate the removal of meat from a carcass primarily in a trimming operation or for removing the meat remains from the bones. These meat cutting tools are either electrically driven or pneumatically driven. An example of a pneumatic driven tool is shown in U.S. Pat. No. 3,852,882. Examples of electric meat cutting tools are shown in U.S. Pat. Nos. 3,024,532; 3,269,010; 4,494,311; 4,363,170 and 4,575,938.

These electrically driven tools generally consist of a tubular handpiece formed of metal or a synthetic plastic material having a hollow bore. An annular blade holder is attached to the front portion of the handpiece with a ring-shaped cutting blade being removably mounted thereon by various mounting arrangements. The blade is formed with gear teeth extending about the top thereof, which teeth are in driving engagement with a pinion gear mounted within the front end of the handpiece. A flexible drive cable is connected at one end to the pinion gear for rotating the ring gear with the other end of the cable being connected to an electric motor located adjacent to an operator work station, generally at a position overhead from the operator. The flexible cable extends from the electric motor to the handpiece and provides the power for rotating the cutting blade. The cable terminates in a squared end which is engaged in a complementary opening in the rear of the pinion gear for rotatably driving the gear.

An operator will start and stop the rotation of the cutting blade by actuating the main switch on the electric drive motor mounted overhead of the work station. This necessitates the operator reaching overhead each time he wishes to start and stop the electric drive motor, and consequently the cutting blade. Therefore, due to the amount of motion that must be performed by the operator to start and stop the trimming knife, the operator usually will permit the main electric motor and knife blade to continue to run between brief pauses in the trimming of the meat from different carcasses which may be brought to the work station on a conveyor or passed to the operator from an adjacent operator. This requires the operator to continually maintain his grip on the handle of the trimming knife with sufficient pressure to prevent the handpiece from twisting or turning in the hand. This continuous pressure over extended periods of time or throughout a usual work shift, fatigues the operator which then decreases the amount of production or meat trimmed during a work shift. Also the handles of the trimming knives usually become coated with grease from the fat of the meat being trimmed requiring sufficient pressure to be maintained on the handle to prevent the handle from turning in the operator's hand due to the rotational motion applied on the handle by the energy of the rotating blade.

Preferably an electric switch is not mounted on the handpiece itself for controlling the overhead electric motor due to the safety involved since the handpiece is usually used in a wet environment and must be cleaned during and after each work shift for sanitary reasons. Therefore, it is impractical to have an electric control switch on the handpiece itself which would permit an operator to conveniently stop and start the drive motor during momentary work stoppages during a work shift.

It is also important that when starting the drive motor that the operator either have at least one hand on the handpiece with the other hand being at a sufficient distance from the handpiece to prevent accidental cutting upon starting the drive motor, or have both hands on the handpiece.

Another problem with prior art electric driven knives having a usual manually actuated ON/OFF switch on the overhead electric motor is that the continuous running of the motor and handpiece blade throughout much of a work shift increases the maintenance cost of the knife. Also the cutting blade, the blade housing, drive pinion gear and flexible drive cable and casing therefor will require replacement more often throughout the operating life of the trimming knife if the blade is continuously rotated even when not in use by the operator.

Another problem with prior art electrically driven knives, is that due to the various sizes of handpieces required for various trimming operations, usually two different sized electric drive motors for the flexible drive cable are required to provide sufficient torque at the cutting blade to perform the required trimming procedure without excessively stalling of the blade and without providing too large a torque to the cutting blade. This required that the manufacturer provide at least two separate sizes of electric drive motors, associated housing and controls for the various handpieces, as well as requiring the user of the handpieces to stock additional inventory of motors and parts, since most trimming operations require various sizes of the handpieces.

Therefore, the need has existed for an improved control system for stopping and starting the rotation of the cutting blade of a meat trimming knife in a simple, economical, efficient and safe manner; and for a mechanism to easily change the torque supplied to the flexible drive cable by the electric drive motor.

SUMMARY OF THE INVENTION

Objectives of the invention include providing a control system for a meat trimming knife which is driven by a flexible drive shaft extending from an electric drive motor mounted remote from the handpiece, which control system enables the operator to start and stop the motor at the handpiece without actuating the main ON/OFF switch of the remotely mounted motor thereby enabling the operator to occasionally relax his grip on the handpiece and flex his hands to relieve pressure and reducing fatigue thereby increasing efficiency in an extremely safe and efficient manner.

A further objective of the invention is to provide such an improved control system for a meat trimming knife in which both hands of the operator are required to be maintained on the handpiece to start the rotation of the cutting blade thereby increasing the safety to the operator, and in which the normal grasping pressure is required by the operator to maintain the knife in its ON position freeing the other hand for movement of the meat during trimming.

A still further objective is to provide such an improved control system in which the operator by manually moving a piston mounted in the rear of the handpiece axially compresses a ring-shaped diaphragm mounted in the handpiece and provides a pneumatic signal to a pressure switch mounted in the electric drive motor which actuates an electric clutch to disengage the output shaft of the electric drive motor from the flexible drive cable of the meat trimming knife; in which the diaphragm is maintained in a collapsed position by locking the piston in its inward position by a hand-held lever movably mounted on the knife; and in which after release of the lever by the operator the piston automatically returns to an outer position by a spring; and in which such outward movement of the piston is sensed by the pressure switch through the expanding diaphragm which actuates the clutch to disengage the drive motor from the flexible shaft.

Another objective of the invention is to provide such an improved control system in which the diaphragm is connected to the pressure switch by a fluid conduit extending from the handpiece along the flexible drive cable casing to the motor; and in which the system operates on atmospheric pressure in a closed trapped system using ambient air as the fluid medium. A further objective is to provide such an improved system in which the input end of the flexible drive cable is connected to the output shaft of the electric drive motor through a gear assembly which increases the rotational speed of the flexible drive cable greater than the output speed of the drive motor thereby permitting more torque to be transmitted through the flexible drive cable to increase the trimming and cutting efficiency of the blade and to provide a longer life for the flexible drive cable and components of the meat trimming knife; and in which the gear assembly enables the output shaft of the drive motor to be maintained in axial alignment with the input of the flexible drive cable.

Another objective of the invention is to provide such an improved pneumatic control system in which the rotating annular cutting blade of the trimming knife stops rotation almost instantaneously upon disengagement of the control clutch since there is negligible inertia mass in the rotating cable and knife components to dissipate; and in which such low mass which must be placed back into rotation provides nearly instantaneous start up with very little power consumption upon engagement of the clutch at the main drive motor to operatively connect the motor shaft with the flexible drive cable.

A further objective of the invention is to provide such an improved control system in which no electrical switches or components are located at the handpiece or connected thereto thereby increasing the safety for the operator of the handpiece since it is used in a wet environment, and which permits the handpiece to be cleaned and maintained in a sanitary condition without concern for such electrical components. Another objective is to provide such a system which increases the safety for the operator since the rotating blade is immediately stopped should the operator drop the handpiece thereby providing a "deadman switch" for the handpiece.

A still further objective of the invention is to provide such an improved pneumatic control system for a meat trimming knife in which the components are readily available and can be incorporated easily into a usual electric drive motor and handpiece with minor modifications, which does not affect the trimming mode of operation by the operator nor requires extensive retraining, and which achieves the desired results in a simple and safe manner.

Another objective of the invention is to provide such an improved pneumatic control system in which the control air is of a low pressure and low volume and is supplied to the handpiece in an open flow system or path whereby leaks occurring in the flow path will not materially effect the operation of the control system.

A further objective of the invention is to provide such an improved pneumatic control system in which an operating lever on the handpiece can be adjusted to adapt the handpiece to be sized to various operator hand sizes by regulating the height of an elastomeric valve member; and in which the operator must actuate the operating lever in a predetermined sequence before the clutch will engage, eliminating the need for two-hand start-up without effecting the safety of the handpiece.

A still further objective of the invention is to provide such an improved control system in which the amount of torque supplied to the flexible drive cable by the drive motor through a connecting clutch can be regulated easily in order for a single size electric drive motor to be used for various sizes of handpieces whereby the torque delivered to the handpieces can be matched to the size of the handpiece and the particular type of trimming operation for which the handpiece is to be used.

These objectives and advantages are obtained by the improved fluid control system of the invention which is used with an electrically driven meat trimming knife of the type having a handpiece with an annular cutting blade rotatably mounted on the front end of the handpiece and driven by a flexible drive cable extending into the rear of the handpiece in which the cable is driven by an electric motor located remote from the handpiece; wherein said control system includes a diaphragm containing a fluid mounted in the handpiece; first means manually actuated by an operator of the trimming knife for changing the volume of the fluid within the diaphragm; and second means for sensing said change in fluid volume and for controlling the rotation of the flexible drive cable in response to said change in the fluid volume.

These objectives and advantages are further obtained by the improved fluid control system of the invention which is used for an electrically driven meat trimming knife of the type having a handpiece with an annular cutting blade rotatably mounted on a front end of the handpiece and driven by a flexible drive cable communicating with the handpiece, wherein said cable is driven by an electric motor located remote from said handpiece, said control system including a pump means located remote from the handpiece for supplying a flow of low pressure control air to said handpiece; first means manually actuated by an operator of the handpiece for changing the flow of low pressure control air to the handpiece; second means for sensing the change in the flow of control air to the handpiece; and third means for controlling the driving of the flexible drive cable in response to said second means sensing the change in the flow of control air.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENTS

Figure 1:
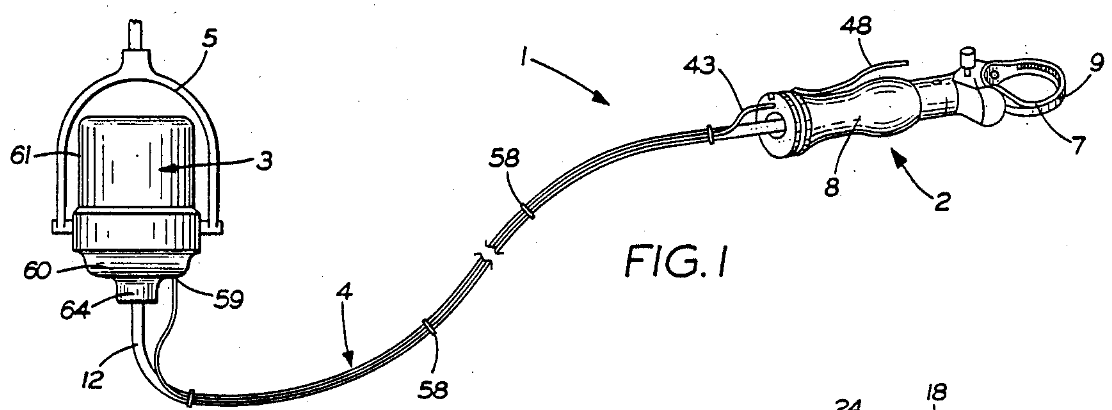
FIG. 1 is a generally diagrammatic perspective view showing a usual electrically driven meat cutting assembly of the type having the modified handpiece and pneumatic control system as a part thereof.

The improved fluid control system of the invention is indicated generally at 1, and is shown in FIG. 1, and includes as the main components a handpiece 2 connected to a electric drive motor 3 by a flexible drive 4. Electric motor 3 is usually supported by a hanger 5 closely adjacent to the work station or table on which the meat trimming operation is being performed. A usual annular metal blade holder 7 or combination metal and plastic holder, is mounted on the front end of a handpiece 8 of trimming knife 2. An annular cutting blade 9 is rotatably mounted on blade holder 7 which may be similar to the types of blades and holders shown in U.S. Pat. Nos. 4,494,311; 4,236,531 and 4,575,938. The particular configuration of the blade and holder may vary and forms no particular part of the present invention.

The blade is provided with a plurality of gear teeth which are formed about the upper end of the blade and driven by a pinion gear. Flexible drive 4 includes an interior flexible cable 11 (FIGS. 2 and 4) which is rotatably mounted and housed within an outer casing 12, both components of which are well known in the art. The inner end of flexible cable 11 terminates in a squared end (not shown) which extends into a complementary-shaped squared opening formed in the rear of the pinion gear which provides the driving connection between cable 11 and the pinion gear in a conventional manner. A preferred mounting of the inner end of flexible cable 11 and casing 12 and the connection with the pinion drive gear for the rotary cutting blade may be of the type shown in U.S. Pat. No. 4,324,043 which is incorporated herein by reference, or by other arrangements well known in the art and forms no particular part of the invention.

In accordance with one of the main features of the invention, the rear end of handpiece 8 (FIGS. 2 and 4) is formed with a main axially extending bore indicated generally at 13, which extends throughout the length of handpiece 8. Bore 13 has a rearmost portion provided with a reduced diameter bore area 14 and a larger bore area 15 forming an annular shoulder 16 therebetween. A piston indicated generally at 18, is manually movably mounted within bore area 15, and includes an annular piston body 19 formed with an axially extending bore 20 having a flared end 21. Piston body 19 includes a front cylindrical portion 22 and a larger cylindrical end flange portion 23 connected by an annular stepped area 24. Piston body 19 as well as handpiece 8, preferably are formed of a plastic material such as a high strength nylon.

Figure 7:
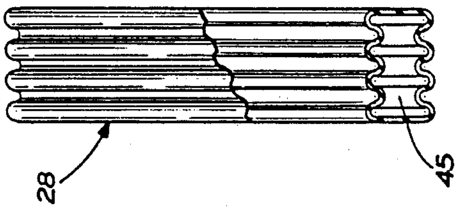
FIG. 7 is an elevational view with portions broken away and in section, of the annular diaphragm of the improved control system removed from within the handpiece.
Figure 2:
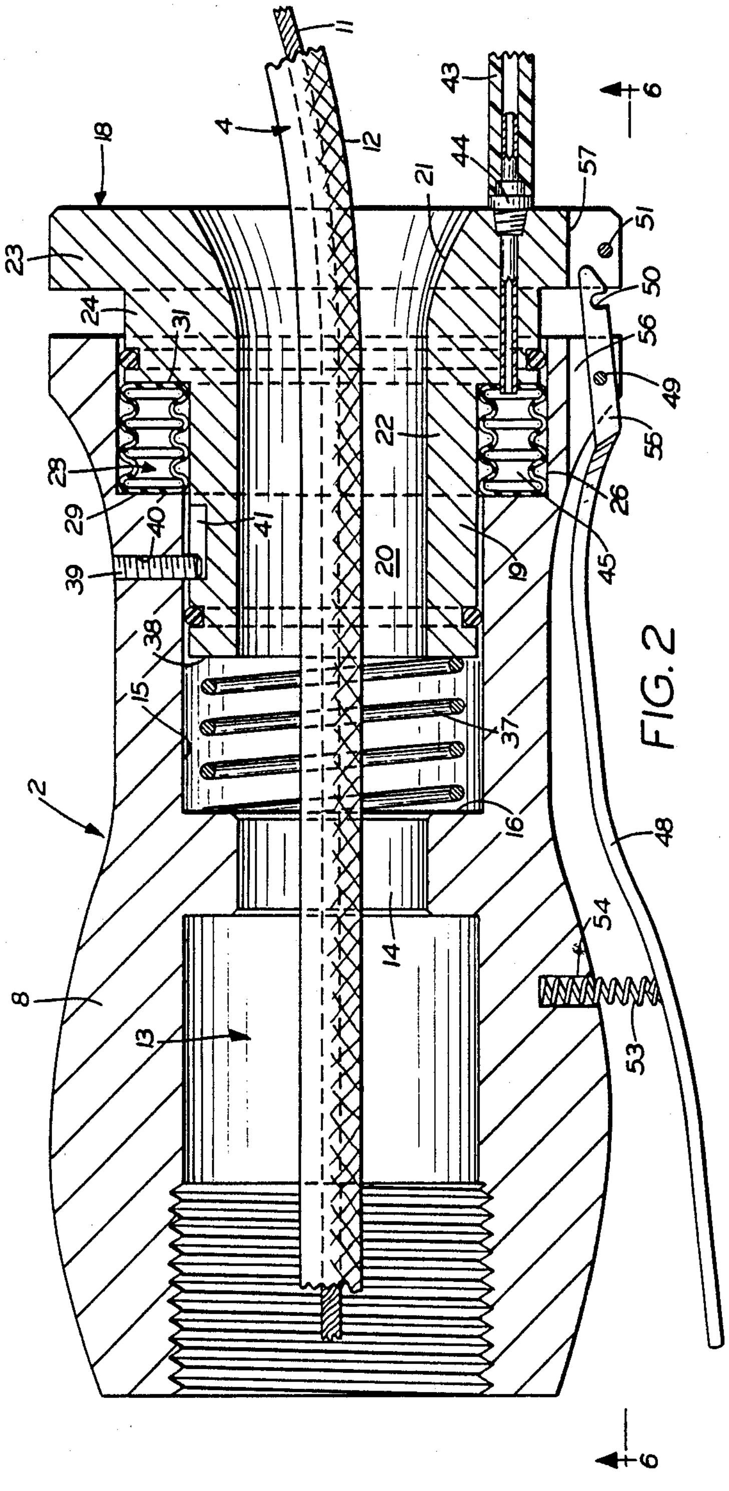
FIG. 2 is an enlarged sectional view of a portion of the improved pneumatic control system mounted within the rear portion of a meat trimming knife.

The rear most end portion of handpiece 8 is formed with a cylindrical chamber or bore 26 coaxial with and forming a portion of main hand piece bore 13. An annular ring-shaped diaphragm indicated generally at 28 (FIGS. 2, 4 and 7), is mounted within chamber 26 and seats against an annular shoulder 29 formed between handpiece bore chamber 26 and bore area 15. Diaphragm 28 is engaged with an annular shoulder 31 formed on piston body 19 between annular stepped area 24 and front cylindrical portion 22. Piston 18 is slidably mounted within bore 13 of handpiece 8 and in particular within bore area 15 thereof by a pair of O-rings 32 and 33 mounted within annular grooves 34 and 35, respectively, formed in piston 18. O-rings 32 and 33 are in sliding generally sealing engagement with the cylindrical walls forming bore 15 and chamber bore 26 to keep the interior of handpiece 8 relatively free of contaminents. Piston 18 is biased to an outer or unlocked position as shown in FIG. 2, by a coil compression spring 37 which is mounted within bore 15 and engaged with annular shoulder 16 and an inner annular end surface 38 of piston 18. A set screw 39 is threadably mounted within a hole 40 formed in handpiece 8 and extends into a slot 41 extending along piston body 19 to retain piston 18 within the end of the handpiece preventing it from being ejected therefrom by spring 37.

A fluid conduit 43 (FIGS. 2 and 4) is attached by a coupler 44 mounted on flanged end 23 of piston 18 and communicates with hollow interior 45 of diaphragm 28 for transmitting fluid between the diaphragm and through conduit 43 to a motor control system indicated generally at 46 (FIG. 3), for controlling the actuation of drive motor 3 as described in greater detail below.

Figure 4:
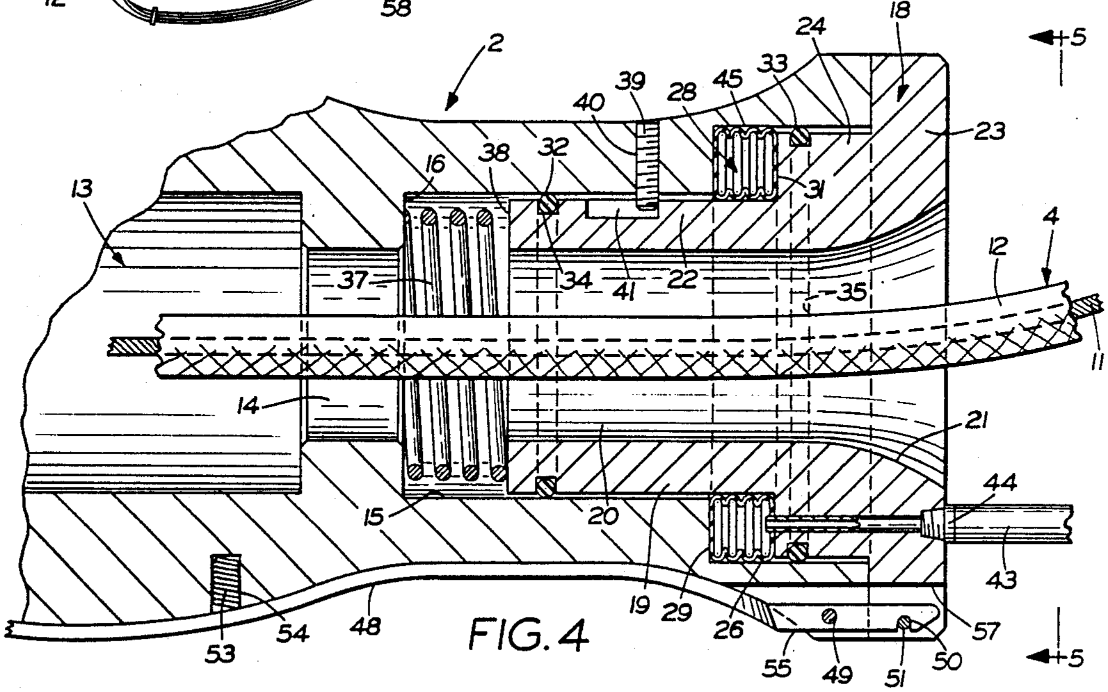
FIG. 4 is an enlarged fragmentary sectional view similar to FIG. 2 showing the manually actuated piston component of the control system in its forward diaphragm compressing position and the manually operated lever in its locked motor run position.
Figure 5:
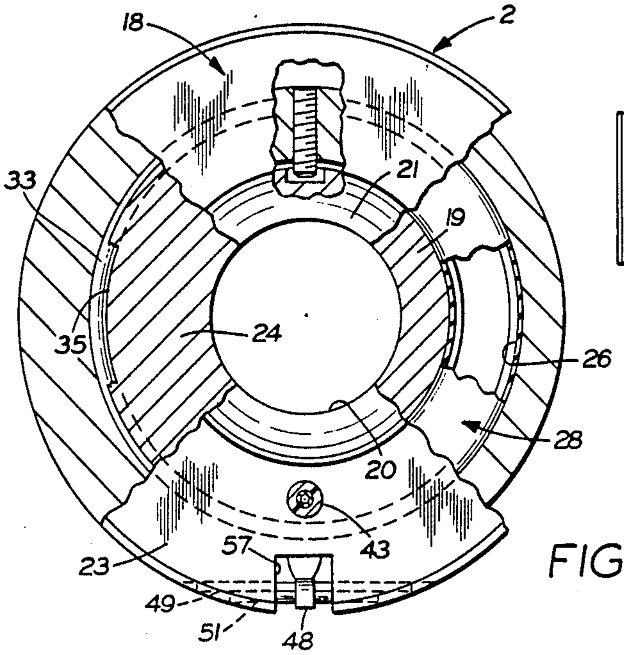
FIG. 5 is an end view with portions broken away and in section, looking in the direction of arrows 5—5, FIG. 4.

Flexible drive 4 extends through piston bore 20 and through the oenter of coil spring 37 and through handpiece bore 13 as shown in FIGS. 2 and 4, without affecting the axial sliding movement of piston 18 or the action of coil spring 37. Cable 11 of drive 4 connects to the pinion drive gear of the rotary blade as shown in U.S. Pat. No. 4,324,043 for rotating blade 9. Flared bore end 21 of piston 18 provides for a smooth transition of flexible drive 4 during the continuous movement of the handpiece by an operator preventing sharp bends or kinks from occurring in the flexible drive.

Figure 6:
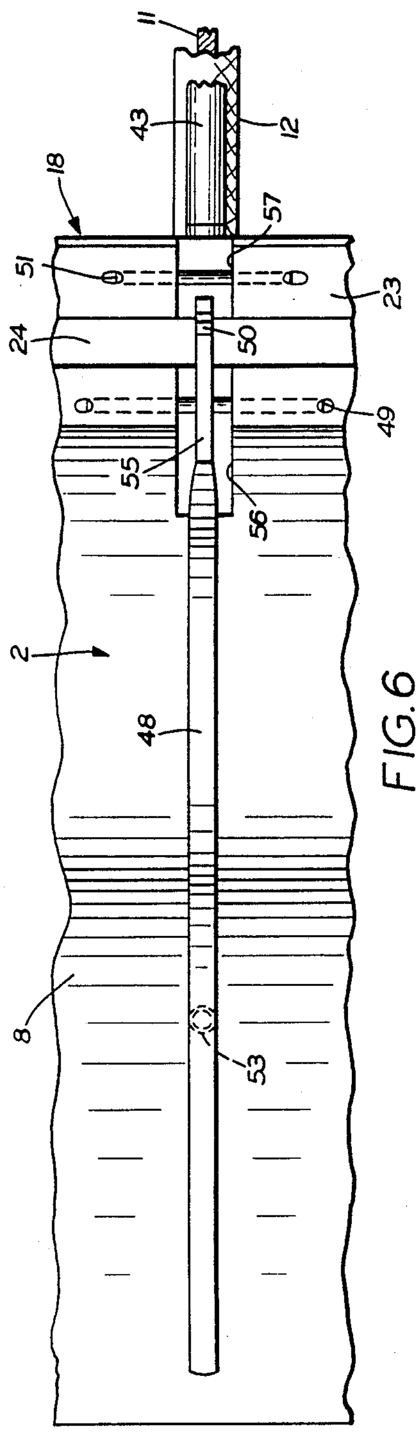
FIG. 6 is a fragmentary elevational view with portions broken away and in section, looking in the direction of arrow 6—6, FIG. 2.

A manually operated lever 48 is pivotally mounted by a pin 49 on the rear portion of handpiece 8 (FIGS. 2 and 4) and includes a locking notch 50 which engages a locking pin 51 mounted on flanged end portion 23 of piston 18 (FIG. 6) for locking piston 18 in its forward position as shown in FIG. 4. A coil compression spring 53 is mounted within a hole 54 formed in handpiece 8 and biases lever 48 to the unlocked position as shown in FIG. 2 in which locking notch 50 is disengaged from pin 51. Notch 50 is formed in a straight end portion 55 of lever 48 which is located within a groove 56 formed in handpiece end 8. Groove 56 aligns with a similarly shaped groove 57 formed in flanged end 23 of piston 18.

In accordance with another of the main features of the invention, fluid conduit 43 extends along flexible casing 12 (FIG. 1) and may be secured thereto by a plurality of spaced ties 58 and is connected by a coupler 59 (FIG. 3) to an end bell 60 of motor 3. Motor 3 is of a usual construction having an outer housing 61 which contains an electric drive motor 62 which is connected to a source of electric power, preferably 120/240 volts AC, and having an output drive shaft 63. Flexible drive 4 is connected to a conical end portion 64 of end bell 60 by a threaded connector 65 and a terminal connector 66.

In accordance with another feature of the invention, motor output shaft 63 is connected through an electrically operated clutch 68 and a idler gear assembly indicated generally at 69, to terminal connector 66 of flexible drive 4. Idler gear assembly 69 includes a cluster gear 70 freely rotatably mounted on a shaft 72 and having a small gear 73 and an integrally connected larger gear 74. Gear 73 is meshingly engaged with a large gear 75 securely mounted on an output shaft 76 of clutch 68 with larger gear 74 of cluster gear 70 being meshingly engaged with a gear 76 which is securely connected to a shaft 77, which in turn is securely connected to terminal connector 66 of flexible drive 4. Shaft 77 is rotatably mounted in a bearing 78 located in an end wall portion 80 of end bell 60. The gearing arrangement provided by cluster gear 70, clutch gear 75 and flexible drive gear 76 is such whereby the normal rotational speed of 3,450 RPM of motor output shaft 63 is increased to a preferred rotational speed of shaft 77 and correspondingly flexible drive cable 11 of 5,000 RPM. This increased RPM increases cutting efficiency of the rotary knife blade by providing more torque and correspondingly reduces the wear on the various components of the meat trimming knife.

In accordance with the main feature of the invention, fluid conduit 43 communicates with a pressure switch 81 which upon actuation provides an electrical output or signal through electric lines 82. Switch 81 is connected to a terminal block 83 and to a DC stepdown transformer and rectifier 84 which supplies 24 volts DC to terminal 83 through electric conductors 85 and to clutch 68 through electric conductors 86. Clutch 68 and pressure switch 81 are located within a compartment 87 of motor end bell 60 which also has a secondary compartment 88 containing terminal block 83 and DC transformer 84. Compartment 87 also houses the various gears for connecting clutch 68 to flexible drive cable 11 thereby enabling end bell 60 to be configured to contain all of the required components without affecting motor housing 61 or the mounting of motor 62 therein.

Switch 81 is a usual pressure switch in which a change in fluid pressure in conduit 43 either opens or closes electrical contacts within the switch to provide an electrical output signal transmitted through electric connectors 82. One type of switch which has been found satisfactory is model P 117L manufactured by Whitman Controls Corporation of Bristol, Connecticut, identified as an enclosed, NEMA IV equivalent pressure/vacuum switch. However, other types of pressure/vacuum switches may be used without affecting the concept of the invention.

Clutch 68 also is a component well known in the art and is electrically operated for coupling input shaft 63 with output shaft 76 upon receiving an electrical signal through conductors 86. A type of clutch found suitable is identified as a type FL manufactured by Inertial Dynamics, Inc. of Collinsville, Connecticut. Again, other types of clutches may be used without affecting the concept of the invention.

The operation of the improved control system of the invention is set forth below. The meat trimming knife is shown in the OFF position in FIG. 2 in which piston 18 is in a rearmost position controlled by the engagement of set screw 39 with the forward end of slot 41. An operator desiring to energize trimming knife 2 will manually pick up the knife in one hand and with the other hand move piston 18 axially inwardly from the position of FIG. 2 to that of FIG. 4. This movement will automatically axially compress diaphragm 28 changing the volume thereof and forcing air or other fluid out of the diaphragm through line 43 to pressure switch 81. This change in fluid volume or pressure in diaphragm 28 is sensed by switch 81 which will emit an electric signal that is applied to clutch 68 through conductors 82 and 86 actuating the clutch to operatively connect rotating shaft 63 to flexible cable 11 through idler gear assembly 69 immediately rotating flexible drive cable 11. It is assumed that the operator previously energized drive motor 3 by actuation of a main control switch therefor.

The operator by pushing inwardly on lever 48 during the normal grasping of the handpiece, will compress spring 53 and engage locking notch 50 of lever end 55 with pin 51 as shown in FIG. 4 maintaining piston 18 in its inward diaphragm compressing position. The operator then releases his hand from the piston for subsequent manipulation of the meat. The operator desiring to stop the rotation of cutting blade 9 releases his grip on lever 48 whereby spring 53 will pivot lever 48 on pin 49 disengaging locking notch 50 from locking pin 51. Coil compression spring 37 will move piston 18 rearwardly to the position of FIG. 2. This movement expands the volume of diaphragm 28 which provides another signal or change in pressure on pressure switch 81 through fluid conduit 43. Another electrical signal is then sent to cluth 68 which disconnects motor shaft 63 from shaft 76 of idler gear assembly 69 and correspondingly from flexible drive cable 11. Motor shaft 63 will continue to rotate until the operator manually pushes piston 18 inwardly to provide another pneumatic signal through conduit 43 upon the change in volume or pressure in diaphragm 28, for reconnecting shaft 63 with cable 11 through clutch 68.

The inertia of the rotating mass consisting of cable 11, rotary blade 9 and the handpiece pinion gear is extremely small. Therefore almost instantaneously upon the disengagement of drive shaft 63 through clutch 68, the blade will cease rotation thereby preventing possible injury to the operator and damage to the blade even if the operator places the meat trimming knife blade directly on the worktable. Upon re-energizing the handpiece by inward movement of piston 18 whereby motor shaft 63 is operatively connected to cable 11, the cutting blade is immediately rotated since the amount of force required for the small mass to be restarted is extremely small. Therefore, an operator upon completing a meat trimming operation on a carcass, may momentarily release his grip on the handpiece which will immediately stop the rotating of the cutting blade by release of locking lever 48 without reaching overhead to disconnect the main electric drive motor as heretofor required. Correspondingly to re-engerize the knife the operator merely picks up the handpiece in one hand pivoting lever 48 inwardly and then shoves inwardly on piston 18 with the other hand which automatically starts the motor by the pneumatic signal sent to switch 81 through conduit 43. Clutch 68 is maintained in a coupled condition by the locking engagement of lever 48 with locking pin 51 of piston 18 until lever 48 is released and another pressure signal is transmitted to switch 81 through conduit 43.

Therefore, the improved pneumatic control system completely eliminates the need for the operator to start or stop the main electric drive motor which is located some distance overhead, and reduces fatigue on the operator's hand throughout a workshift by enabling the operator to conveniently release his grip on the handpiece and lay it on the worktable numerous times throughout a work period thereby increasing the efficiency of the operator. The improved system also reduces the continuous running of the various moving components of the handpiece, correspondingly increasing the wear life thereof and reducing maintenance and replacement cost. The system further provides a "dead man switch" to the handpiece, that is, should the handpiece be accidentally dropped locking lever 48 is automatically released whereupon the piston moves rearwardly causing clutch 68 to disengage motor drive shaft 63 from flexible drive cable 11. Also the improved system completely removes all electrical components from the handpiece thereby enabling the handpiece to be free of possible shock hazards to the operator and enabling the handpiece to be completely washed and sanitized after each work shift.

Futhermore, the usual manner of manipulating the handpiece during the trimming of a carcass by the operator is not restricted nor does the improved control system require any retraining of the operator. Also, the particular gearing assembly mounted within the end bell of the main drive motor enables the rotational speed of the flexible drive cable to be greater than the nominal rotational speed of the drive motor thereby increasing cutting efficiency of the rotating blade. Another advantage is that the electric clutch and pneumatic switch are mounted within an end bell or housing of the electric drive motor and are readily available inexpensive components. These components are useable with the motor without modification to the motor since they are located entirely within the chamber formed in the end bell which can be adapted to be mounted on the usual motor housing.

The particular ring-like configuration or shape of diaphragm 28 may be modified if desired without affecting the concept of the invention. The main function of the diaphragm is to provide a pneumatic signal to pressure switch 81 which could be accomplished with other configured diaphragms mounted within the handpiece.

Another advantage of the improved control system is that the pneumatic control is achieved by a trapped fluid or air system consisting of diaphragm 28 and fluid conduit 43 which extends along flexible drive casing 12 to pressure switch 81. Air is the preferred fluid although other types could also be used without affecting the operation of the improved control system. Furthermore, other piston arrangements which are incorporated into the handpiece instead of the inward sliding movement of piston 18 for generating the pneumatic signal, although piston 18 is believed to be the preferred embodiment and mechanism for achieving the pneumatic signal for control of clutch 68.

The improved invention also includes the method for controlling the rotation of the meat trimming knife blade which as described above consists broadly of compressing diaphragm 28 which is located within the handpiece which changes the volume of the fluid within the diaphragm, afterwhich this change of volume is sensed for generating an electrical signal which is then used to effect the rotation of the flexible drive cable by the actuation of clutch 68 which either engages or disengages motor drive shaft 63 with flexible cable 11.

Figure 8:
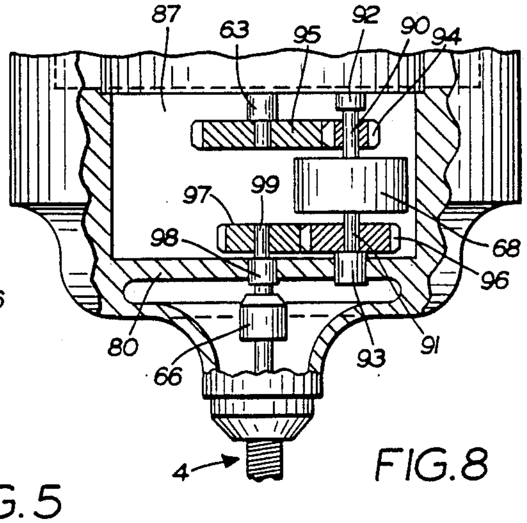
FIG. 8 is a fragmentary view with portions broken away and in section showing a modified gear arrangement for connecting the output shaft of the motor to the flexible drive cable.

A modified gearing arrangement for connecting motor output shaft 63 to terminal connector 66 of flexible drive 4 is shown in FIG. 8. Clutch 68 is mounted within compartment 87 on a pair of shafts 90 and 91 which are rotatably mounted in bearings 92 and 93, respectively. A small gear 94 is mounted on shaft 90 and is drivingly connected to a larger gear 95 which is connected to motor output shaft 63. A gear 96 is attached to shaft 91 and is drivingly connected to another gear 97 which in turn is connected to terminal connector 66 by a shaft 99 which extends through a bearing 98 mounted in end wall portion 80. The size of gears 96 and 97 will vary depending upon the particular rotational speed to be imparted to drive cable.

Figure 3:
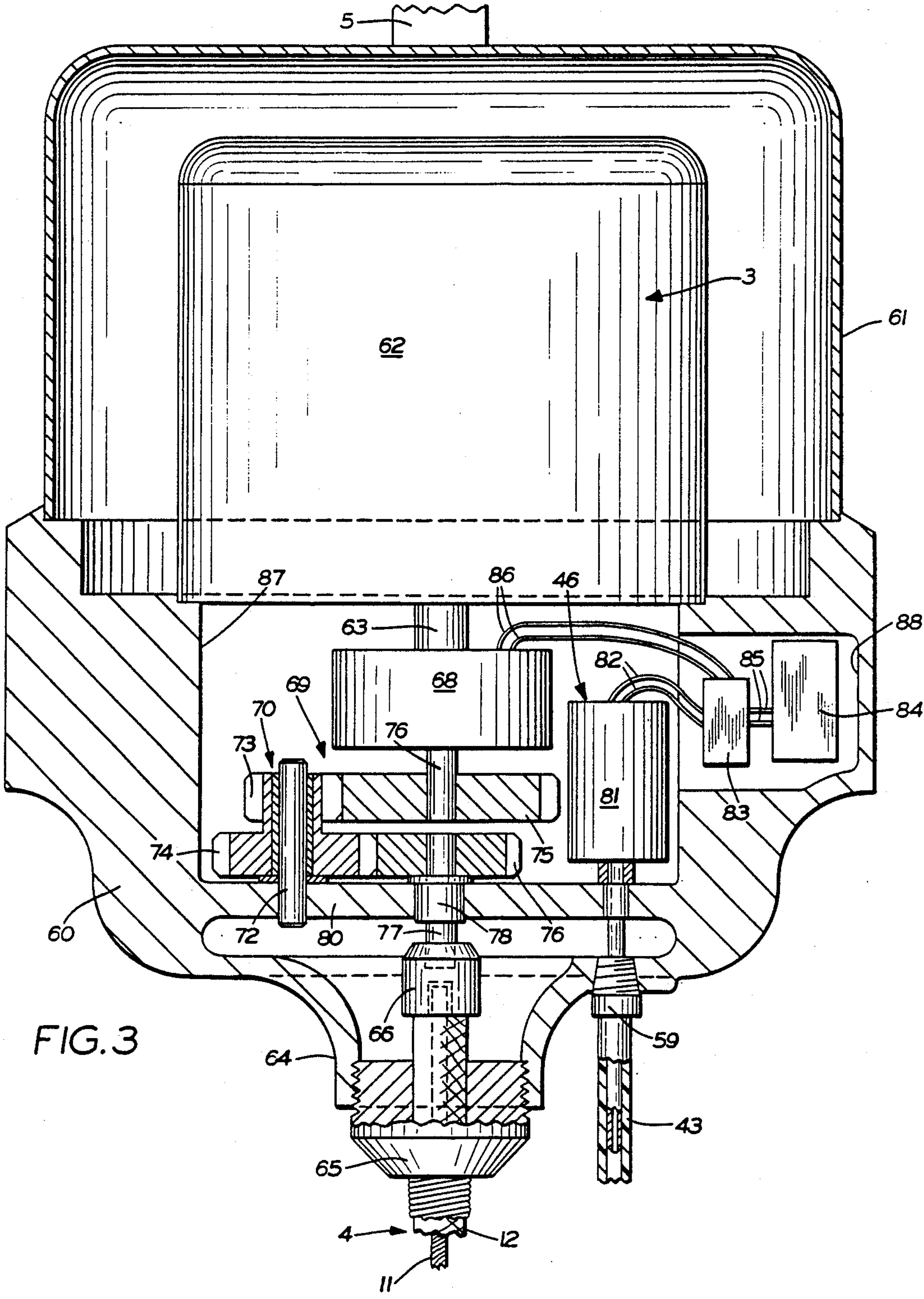
FIG. 3 is an enlarged sectional view of the electric motor and components thereof of the improved control system for connecting the output shaft of the motor with the flexible drive cable which extends to the meat trimming knife.
Figure 9:
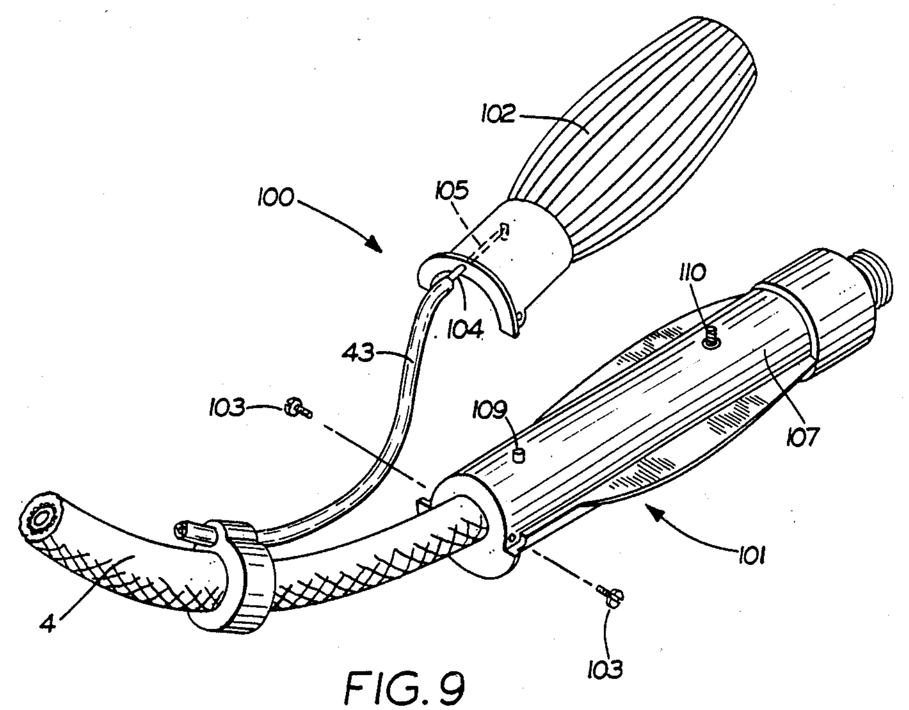
FIG. 9 is an exploded fragmentary view of a modified handpiece for use in a modified pneumatic control system of the invention.

The operation of this gearing arrangement is generally similar to that as shown in FIG. 3. Rotation of drive motor shaft 63 will rotate attached gear 95 and correspondingly gear 94 and attached shaft 90 which is operatively connectable with shaft 91 through clutch 68.

Upon engagement of clutch 68, shaft 91 will rotate together with attached gear 96 which drives gear 97 and shaft 99 which then rotates flexible drive cable 11 through terminal connector 66. With this gearing arrangement, gears 94 and 95 will continue to rotate with motor 63 when clutch 68 is disengaged with gears 96 and 97 being stationary until clutch 68 is engaged to couple drive shaft motor 63 with flexible drive cable 11.

A modified form of the improved control system is indicated generally at 100 and is shown particularly in FIGS. 9–14. Control system 100 includes a modified handpiece indicated generally at 101, and shown particularly in FIGS. 9–11. Handpiece 101 is similar to that of handpiece 2 described above, in that it is driven by flexible drive 4. The blade mounting housing and rotary blade and drive gears therefore is not shown for handpiece 101 but is the same of that of handpiece 2 or the same as well known prior art electrically driven handpiece constructions.

Handpiece 101 includes a lever 102 which is pivotally mounted at the rear end of the handpiece by a pair of pivot bolts 103. Fluid conduit 43 is connected to a barbed stainless steel tube 104 which is mounted in an opening 105 formed in the end of lever 102 so as to provide an air flow path to the lever. Opening 105 terminates in an air discharge opening 106 also formed in the lever which communicates with the surrounding atmosphere adjacent the handpiece main body 107 on which lever 102 is pivotally mounted.

Figure 10:
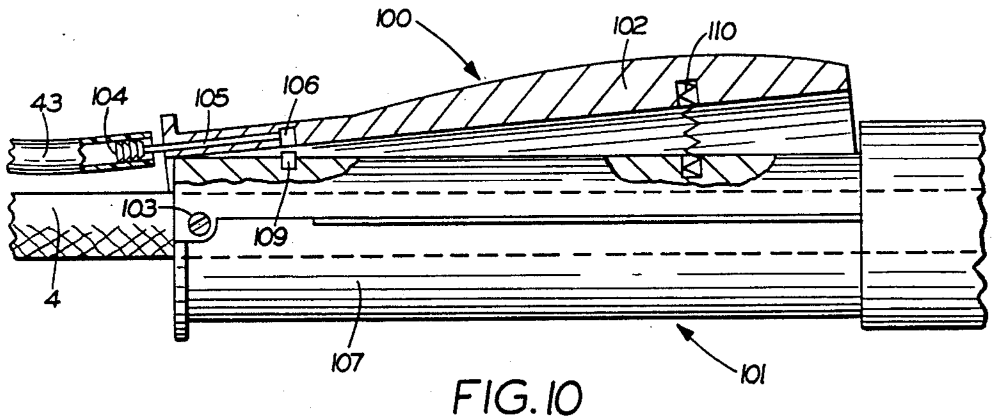
FIG. 10 is an enlarged fragmentary view with portions broken away and in section, showing the modified handpiece operating lever in open position.
Figure 11:
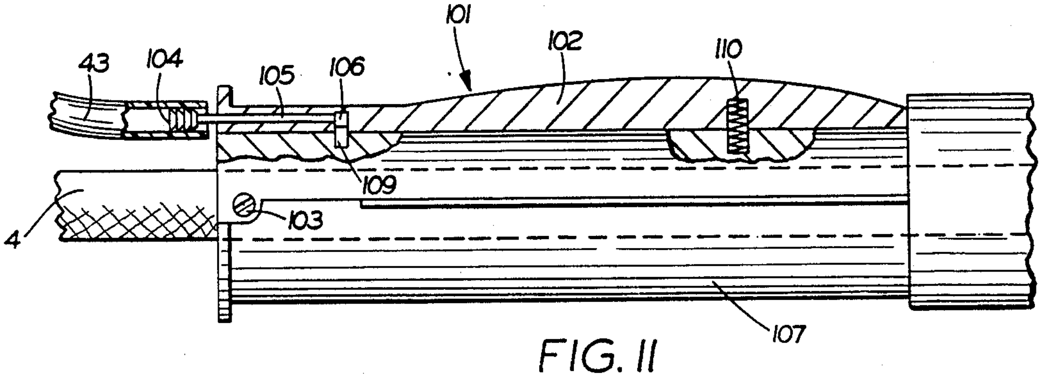
FIG. 11 is a view similar to FIG. 10 showing the handpiece lever in closed position.

In accordance with one of the features of modified control system 100, is the mounting of an elastomeric, preferably cylindrical-shaped control valve 109 in an outwardly projecting manner on handpiece body 107. Valve 109 extends into and blocks air flow discharge opening 106 when the lever is in the closed position as shown in FIG. 11 and is disengaged from discharge opening 106 when the lever is in the open position as shown in FIG. 10. A coil spring 110 also is mounted on handpiece body 107 in a forwardly spaced position from control valve 109 and engages and biases lever 102 toward the open position as shown in FIG. 10. By regulating the height of control valve 109, the amount of lever movement required of lever 102 before discharge opening 106 is opened and closed can be varied to match the particular size of the operator's hand. Thus an operator with a relatively large hand may desire a longer control valve 109 than an operator with a smaller hand in order to vary the amount of pivotal movement of lever 102 before the discharge opening is opened or closed by the control valve.

Figure 13:
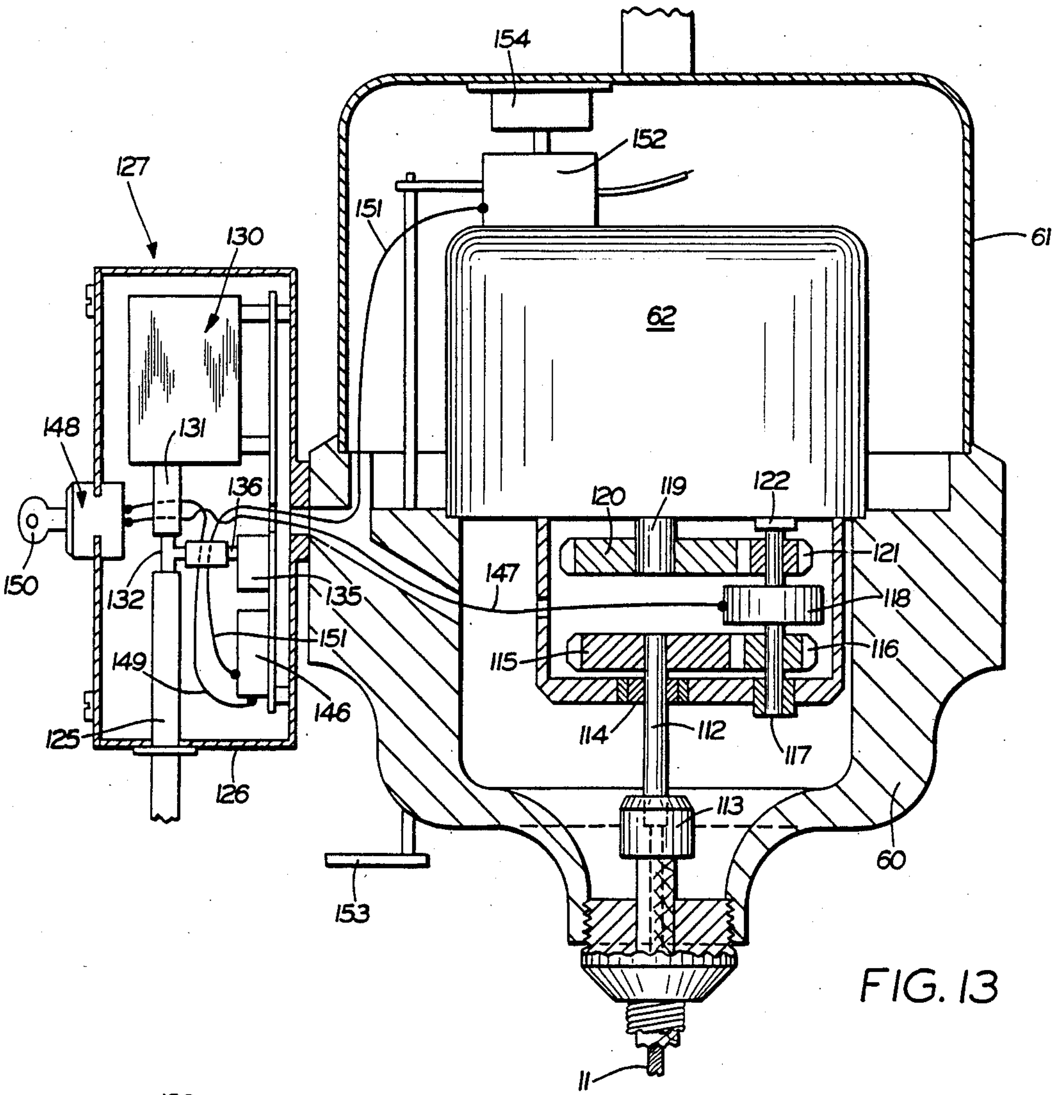
FIG. 13 is a sectional view of the electric drive motor and control components thereof of the modified control system which provides the low pressure, low volume air flow to the modified handpiece of FIG. 9

Referring to FIG. 13, drive cable 11 is connected to a stub shaft 112 by a coupler 113 with stub shaft 112 being rotatably mounted in a bearing 114 and connected to a gear 115. Gear 115 is drivingly engaged with another gear 116 which is secured to another stub shaft 117, which in turn is connected to an electric clutch 118. Motor shaft 119 is secured to a gear 120 which engages another gear 121 which is secured to a clutch input shaft 122. Air conduit 43 is connected to a coupling tube 125 which extends outwardly from bottom wall 126 of a control housing indicated generally at 127, which is mounted on the side of motor housing end bell 60.

Figure 14:
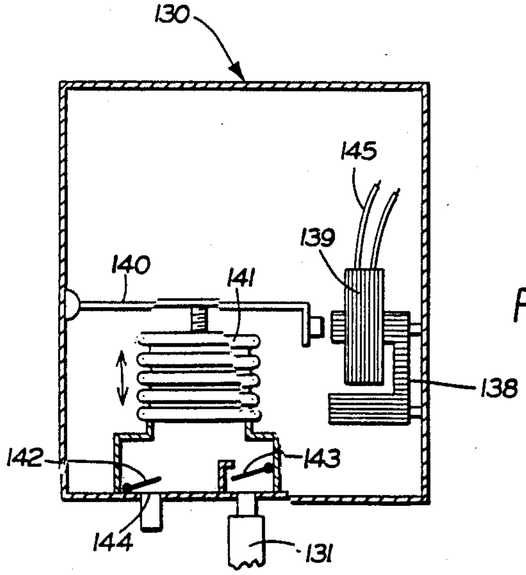
FIG. 14 is a generally diagrammatic view of one type of diaphragm air pump for supplying the low pressure, low volume control air flow to the handpiece of FIG. 9.

In accordance with one of the features of the invention, a diaphragm air pump indicated generally at 130, the details of which are shown in FIG. 14, is mounted within control housing 127 and has an air output line 131 connected to a tee 132 which completes the flow path to coupling tube 125. Tee 132 is connected to a pressure sensor 135 by a short section of conduit 136.

Referring to FIG. 14, diaphragm pump 130 is of a usual construction and may consist of C-shaped coil 138 and an associated winding 139 which oscillates a pivotally mounted pump arm 140. Arm 140 actuates a bellows 141 which supplies a source of low pressure, low volume air through output line 131. A pair of flapper valves 142 and 143 communicate with bellows 141 for controlling the flow of air from the bellows into output line 131 or discharge opening 144. Pump 130 is of the usual construction one example of which is identified as model WISAlOO which is manufactured by Wisa of West Germany. However, other types of diaphragm pumps may be utilized without effecting the concept of the invention.

Pump 130 generates a supply of low pressure compressed air, preferably 2 lbs./sq.in. at a low volume of approximately 1.1 liters/min., which is supplied to air conduit 43 through tee 132 and coupling tube 125 as described above. AC power is supplied to pump winding 139 through power supply line 145 which preferably is connected to the internal wiring of electric drive motor 62 so that should power be disconnected to main drive motor 62, no power will be supplied to the diaphragm pump.

Figure 12:
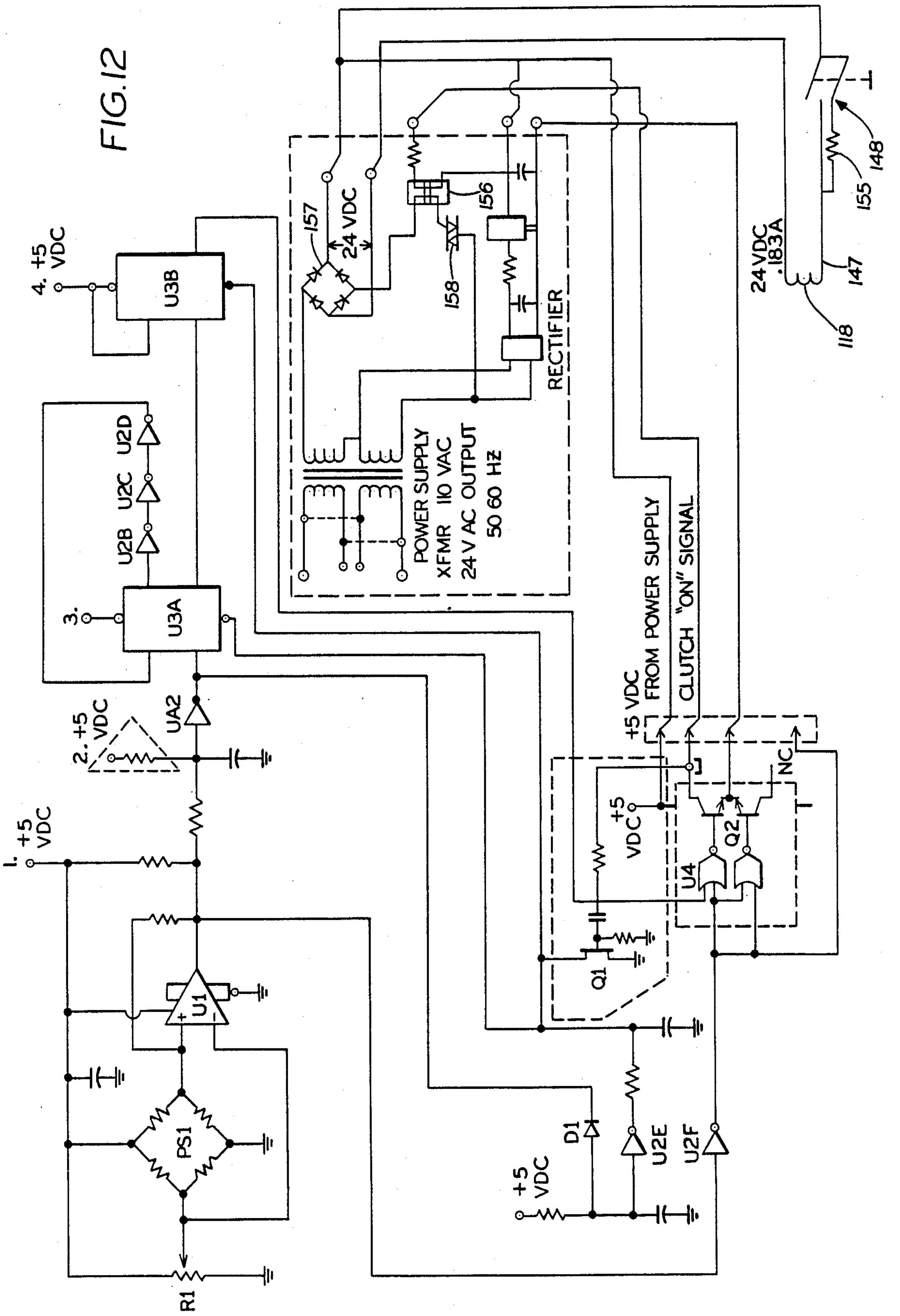
FIG. 12 is an electrical schematic diagram of one type of logic control circuit for the modified pneumatic control system of the invention.

In further accordance with the invention, an electrical logic circuit indicated generally at 146, which is shown in detail in FIG. 12, is mounted within control housing 127 and is connected to clutch 118 by conductor 149 through a key actuated torque selector indicated generally at 148, and conductor 147. A manually operated key 150 controls torque selector 148 as described in greater detail below. A manually operated main motor ON/OFF control switch 152 is mounted within housing cover 61 and is controlled by a lever 153 and is connected to electrical logic circuit 146 by conductor 151.. Switch 152 may be connected to a power supply board 154 which in turn is connected to the main source of 120 volt AC power supply for the motor and the control housing components mounted therein.

The operation of modified control system 100 is as follows. Air pump 130 generates the low pressure, low volume air flow to modified handpiece 101 through conduit 43. The air is discharged into the surrounding atmosphere through discharge opening 106 so long as lever 102 is in the open position of FIG. 10. When the handpiece discharge opening 106 is closed by control valve 109 upon the operator moving the handpiece lever to the closed position of FIG. 11, back pressure is created in conduit 43 which is sensed by pressure sensor 135. The relatively small size of conduit 43 keeps the air volume low so that the back pressure climbs quickly and restores quickly. This back pressure or increase in pressure at sensor 135 causes logic circuit 146 to register a logic "high". When the operator releases hand pressure on the handpiece and the air flow is released to the surrounding atmosphere through discharge opening 106, the pressure sensor causes the counter to register a logic "low". The counter circuit must see one "high" followed by one "low" followed by two additional "highs" and "lows" before closing a circuit which supplies electric power to clutch 118 through conductor 147. Clutch 118 then drivingly connects the first gear set 120 and 121 to the second gear set 115 and 116 supplying rotation to flexible shaft 11 for rotating the cutting blade mounted at the front end of the handpiece. When the logic circuit sees a "low" after clutch 118 is engaged, which indicates that the operator has released his grip on the lever and has opened discharge opening 106, the logic circuit will disengage clutch 118, stopping the rotation of drive cable 11. Once the lockout circuit is engaged, it prevents the clutch from being engaged again until the complete start-up sequence discussed above is repeated.

The electric power for the diaphragm pump logic control circuit and clutch 118 preferably is derived from the motor internal wiring so that if the motor is stopped by its internal over current/temperature sensor, the logic circuit shuts down so that the clutch can not engage to rotate the handpiece cutting blade in the event the motor automatically restarts until the operator re-executes the start sequence by squeeze/release of the handpiece as discussed above.

In accordance with another feature of the invention, torque selector 148 is interposed in the electrical supply line to clutch 118 with the clutch being connected to logic circuit 146 through conductors 147 and 149. By manual movement of key 150, a resistor 155 is inserted into the clutch control circuit which allows the power to the clutch to be reduced so that the torque delivered by the clutch to drive cable 11 may be reduced when small handpieces are utilized which require less driving torque. When a larger handpiece is used, the resistor is removed from the clutch control circuit to provide increased torque to the clutch for transmission to the drive cable. This feature provides additional safety in that once the desired torque setting is set, key 150 is removed from torque selector 148 preventing the operator from changing the torque which is supplied to the handpiece. This feature will allow the use of one motor for both large and small handpieces, yet will enable only the correct amount of torque to be supplied to the handpiece, which can be controlled only by authorized operating personnel.

Thus, this modified control circuit uses an open air flow arrangement since the diaphragm pump air output is discharged into the surrounding atmosphere unless its discharge opening 106 is closed by the lever. This open arrangement prevents any small leakage in supply conduit 43 or connections thereto from effecting the operating characteristics of the control system. Also this low pressure, low volume air supply can be achieved by an extremely simple and inexpensive diaphragm pump of a type well known in the art and readily available for use, which has proven durability and operates on an extremely small amount of power. Another advantage is that by simple replacement, or adjustment of elastomeric control valve 109, the amount of lever movement for operating the handpiece can be regulated to accommodate operators having various hand sizes and movement characteristics.

Also, another main feature achieved by this modified control system is the use of torque selector 148 enabling a single electric drive motor to be utilized for both large and small handpieces while supplying only the desired amount of driving torque to the handpiece.

One type of electrical circuitry used for achieving the results of the improved control system is shown particularly in FIG. 12. Various features of this control system could be modified by anyone skilled in the art to achieve those features discussed above and described in greater detail below. The following is a brief description of the general features of the electrical circuitry of FIG. 12.

PS1, U1 and associated circuitry form a pressure sense to logic level converter, with the output from U1 being high or low as air pressure to PS1 is high or low, respectively. U2A, U3A, U2B, U2C, U3B, D1, U2E, U2F, and associated circuitry form the logic counter and the clutch enable circuit, responsive to the logic pulse inputs from the pressure sense to the logic level converter. U4 provides the signal to an opticoupler 156 on the power supply and triac 158 to apply A.C. power to a bridge rectifier circuit 157. This provides switched supply to the clutch through the key switch, which may be set to select off, low torque coupling through resistor 155 or high torque coupling through direct connection. In the low torque selection, a portion of the power to the clutch is dropped across resistor 155, so that the clutch coil develops less magnetic flux and the clutch plates are allowed to slip when torque exceeds a predetermined value. Q1 and associated circuitry form an "off" lockout circuit which prevents restart of the unit after the unit is running and stops, until all required counts are re-registered in the logic counter circuit. The transformer, rectifier, filter caps and the voltage regulator form the logic circuit power supply which provide power to the logic level converter, logic counter and the "off" lockout circuits. The area in the dash lines is the power supply section.

Accordingly, the improved control system is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding, but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved control system is constructed and used, the characteristics of the system, and the advantageous, new and useful results obtained; the new and useful structures, devices, elements, arrangements, parts, and combinations, are set forth in the appended claims.

I claim:

1. A fluid control system for an electrically driven meat trimming knife of the type having a handpiece with an annular cutting blade rotatably mounted on a front end of the handpiece and driven by a flexible drive cable communicating with the handpiece, said cable being driven by an electric motor located remote from said handpiece, said control system including:

(a) pump means located remote from the handpiece supplying a flow of low pressure control air to said handpiece;

(b) first means manually actuated by an operator of the handpiece for changing the flow of low pressure control air to the handpiece;

(c) second means for sensing the change in the flow of control air to the handpiece; and (d) third means for controlling the driving of the flexible drive cable in response to said second means sensing the change in the flow of control air.

2. The control system defined in claim 1 in which the first means is a lever movably mounted on the handpiece and manually movable between first and second positions for opening and closing, respectively, a flow path of the control air at the handpiece.

3. The control system defined in claim 2 in which the air flow path communicates with the surrounding atmosphere at the handpiece when the lever is in the first position.

4. The control system defined in claim 2 in which the lever is pivotally mounted on the handpiece and is spring biased toward the first position.

5. The control system defined in claim 2 in which the second means includes pressure sensor means for providing an electrical signal to the third means upon sensing the change in air flow at the handpiece upon movement of the lever between the first and second positions.

6. The control system defined in claim 5 in which the third means is a clutch operatively connecting and supplying the driving torque to the drive cable from an output shaft of the electric motor; and in which the electrical signal actuates the clutch to control operative engagement of the motor shaft and drive cable.

7. The control system defined in claim 6 in which torque select means communicates with the clutch for regulating the amount of torque delivered by the clutch from the motor shaft to the flexible drive cable.

8. The control system defined in claim 7 in which the torque select means includes a key operated switch so that only authorized personnel can regulate the amount of torque delivered by the clutch to the flexible drive cable.

9. The control system defined in claim 7 in which the torque select means includes a resistor to absorb electrical power from the electrical signal supplied to the clutch by the pressure sensor means.

10. The control system defined in claim 5 in which the pressure sensor means includes a pressure sensor which is actuated by back pressure created in the sensor when the lever is moved to the second position, and a logic circuit which communicates with the sensor and supplies the electrical signal upon the sensor being actuated by said back pressure.

11. The control system defined in claim 10 in which the logic circuit contains a counter which counts the number of times an operator moves the lever between the first and second positions; and in which the logic circuit supplies the electric signal to the third means only after the counter counts a certain number of said lever movements within a predetermined time period before supplying said electrical signal.

12. The control system defined in claim 10 in which electric power is supplied to the logic circuit and pump means from internal wiring of the electric motor.

13. The control system defined in claim 2 in which the low pressure control air is supplied to the handpiece by the pump means through a hollow conduit extending along the flexible drive cable.

14. The control system defined in claim 13 in which the hollow conduit has a discharge opening which is open to the atmosphere at the handpiece for exhausting the low pressure air flow into the atmosphere when the lever is in the first position; and in which the lever closes said discharge opening blocking the flow of control air into the surrounding atmosphere when the lever is in the second position.

15. The control system defined in claim 14 in which the lever is pivotally mounted on the handpiece; and in which the discharge opening is formed in the lever.

16. The control system defined in claim 15 in which a valve member is mounted on the handpiece and opens and closes the conduit discharge opening upon pivotal movement of the lever between the first and second positions.

17. The control system defined in claim 16 in which the valve member is a piece of elastomeric material which projects outwardly from the handpiece toward the lever and is adjustable in height to regulate the amount of movement of the lever required for opening and closing of the discharge opening by the valve member.

18. The control system defined in claim 1 in which the control air has a pressure of approximately 2 lbs./sq.in.

19. The control system defined in claim 18 in which the control air has a flow of approximately 1.1 liters/-min.

20. The control system defined in claim 1 in which the pump means is a diaphragm pump.

* * * * *